March 6, 1928.  
R. WICHTENDAHL  
VARIABLE CHAIN DRIVE  
Filed May 9, 1927  
1,662,037  
2 Sheets-Sheet 1
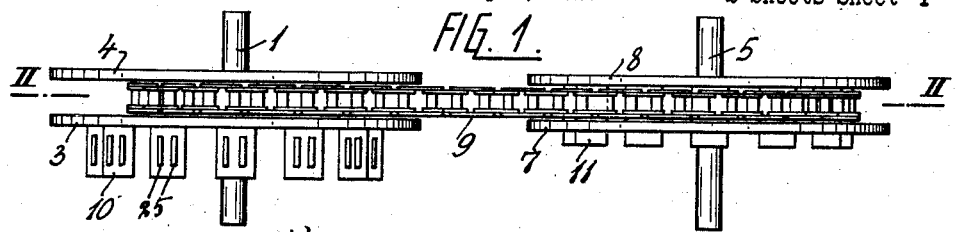
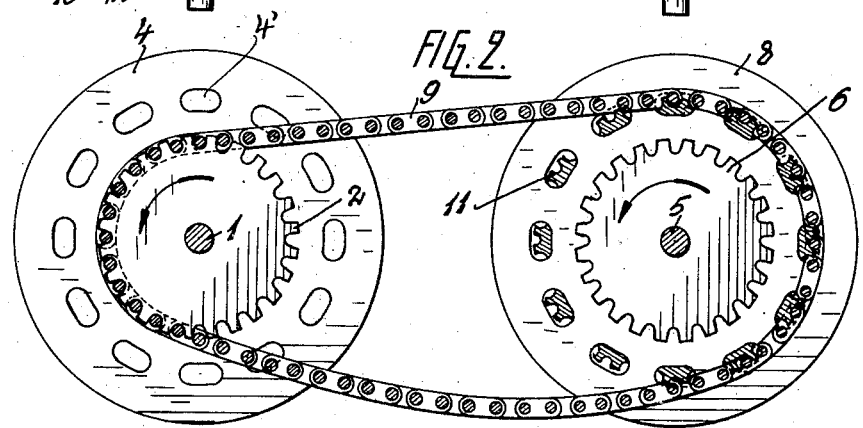
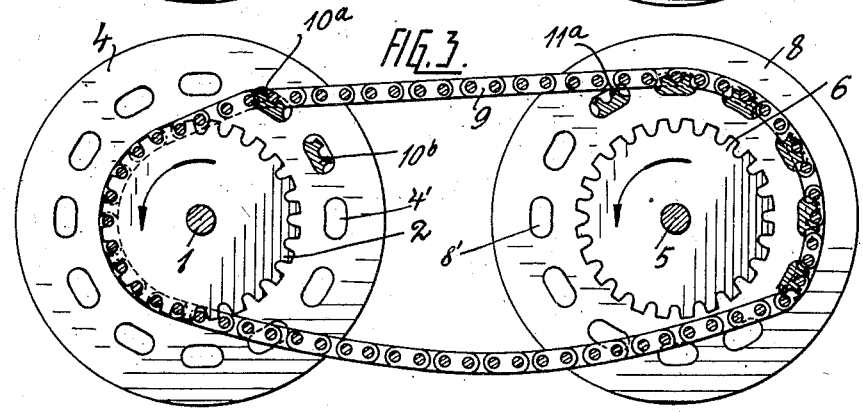
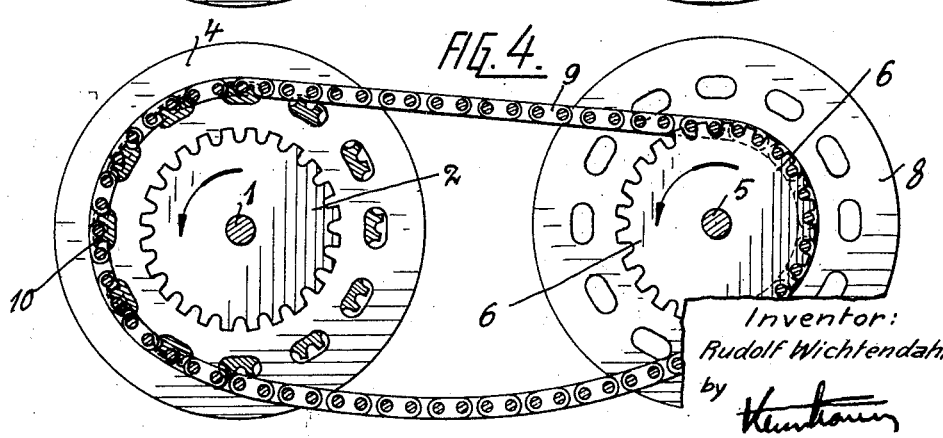
Inventor:  
Rudolf Wichtendahl  
by  
Atty.

March 6, 1928. 1,662,037
R. WICHTENDAHL
VARIABLE CHAIN DRIVE
Filed May 9, 1927   2 Sheets-Sheet 2

Inventor:
Rudolf Wichtendahl
by
Arty.

Patented Mar. 6, 1928.

1,662,037

UNITED STATES PATENT OFFICE.

RUDOLF WICHTENDAHL, OF HANOVER, GERMANY.

VARIABLE CHAIN DRIVE.

Application filed May 9, 1927, Serial No. 189,973, and in Germany January 20, 1926.

My invention relates to chain drives. It is an object of my invention to provide a variable chain drive, that is, a chain drive the ratio of which can be varied without exchanging parts and while the drive is in operation.

To this end I mount on each shaft a collapsible sprocket, such sprocket being constituted for instance by a disc or pair of discs or the like serving as support for a circular row or a plurality of such rows of coupling and power transmitting members, and I provide means for alternately moving one or the other row of members into and out of operative position, while the drive is in operation so that during the operation of the drive the chain may be supported on one or the other of several concentric rows of members, such rows differing in diameter. In this manner the ratio of gearing can be varied during the operation.

I may, however, also combine the collapsible sprockets with ordinary sprockets, a collapsible and an ordinary sprocket being mounted side by side on each shaft and the chain being supported either on the ordinary sprocket on one shaft and the collapsible sprocket on the other shaft or on the two collapsible sprockets of the two shafts. In this case the form of the collapsible sprockets may be modified inasmuch as only a single circular row of power transmitting members is provided on each of the sprockets.

In the drawings affixed to this specification and forming part thereof a chain drive of the last mentioned type embodying my invention is illustrated diagrammatically by way of example.

In the drawings

Figs. 1–4 are diagrams, Fig. 1 being a plan view, and Figs. 2, 3, and 4 being sectional elevations, taken on the line II—II in Fig. 1, and showing different phases of adjustment.

Figure 5:
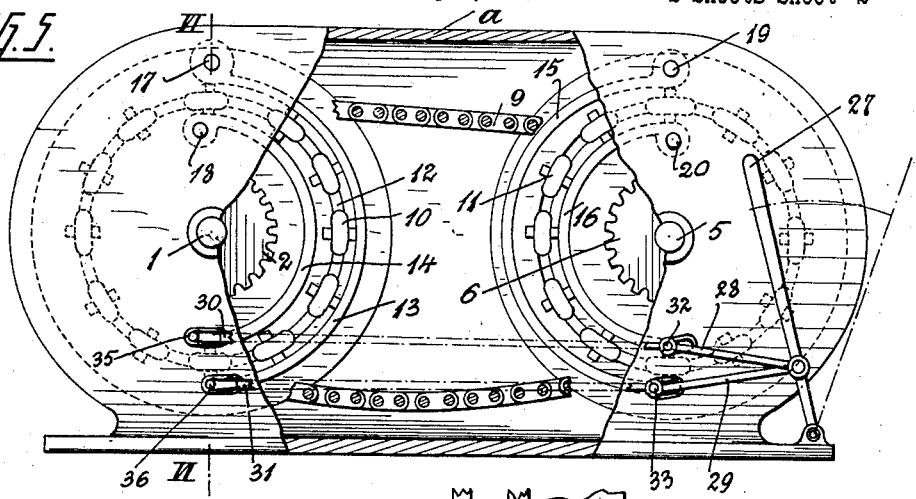
Fig. 5 is an elevation of a casing.

Referring to the drawings, and first to Figs. 1–4, 1 is a shaft, 2 is an ordinary sprocket mounted on said shaft, and 3 and 4 are discs mounted on either side of the sprocket. 5 is the other shaft of the pair, 6 is its ordinary sprocket, and 7 and 8 are discs mounted on said shaft. The shafts are supposed to rotate anti-clockwise, shaft 1 being the driving shaft. 9 is the chain coupling the shafts.

10 and 11 are slides adapted to be displaced in perforations 4' and 8', respectively, arranged in the discs 3 and 7 in circular rows of larger diameter than the ordinary sprockets. 12 are ribs extending transversely to the plane of one of the discs of each pair and serving for guiding the slides. Means described below are provided for moving the slides into position between the discs to form a sprocket of larger diameter.

Figs. 1 and 2 show the collapsible sprocket surrounding the ordinary sprocket 6 on shaft 5 in operative condition. The chain is supported on the sprocket 7, 8 having a larger diameter than the sprocket 2 on shaft 1, which is thus driven at higher speed. Fig. 3 illustrates an intermediate stage, where the slides 11$^a$ are being shifted into inoperative position, while the slides 10$^a$, 10$^b$ are being thrown in, while the shafts are rotating. Fig. 4 shows the chain 9 supported on the collapsible sprocket 3, 4, 10 of shaft 1 and on the ordinary sprocket 6 of shaft 5.

Figure 6:
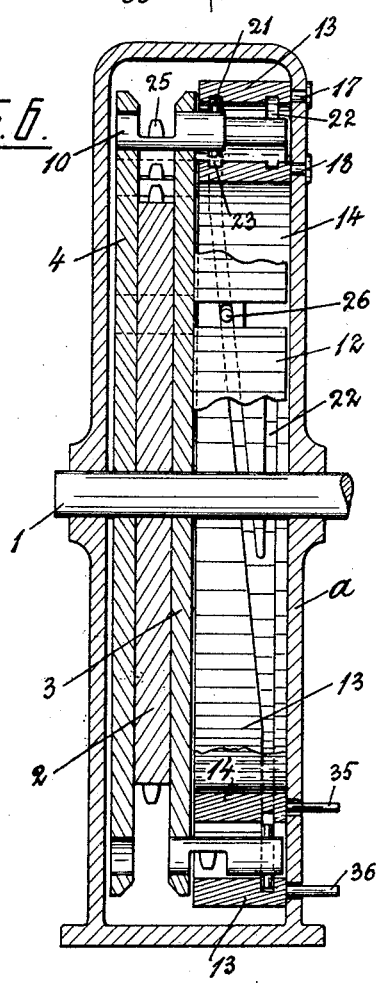
Fig. 6 is a section on the line VI—VI in Fig. 5, drawn to a larger scale.
Figure 7:
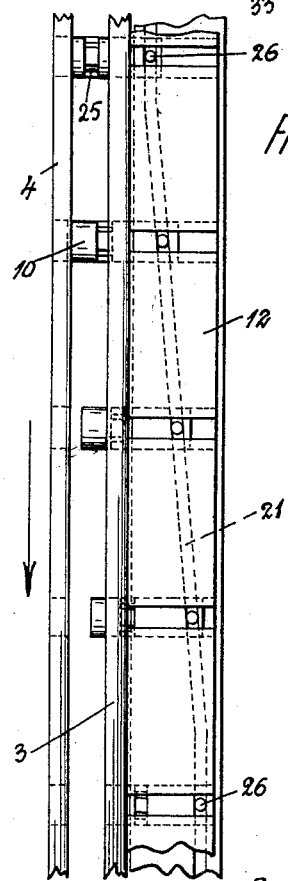
Fig. 7 is a development of part of a collapsible sprocket.

Referring now to Figs. 5, 6 and 7, $a$ is a casing in which the shafts 1 and 5 with the ordinary sprockets 2 and 6 are supported. 13, 14 and 15, 16 are guide bows which are arranged in the casing $a$ to rock about pins 17, 18 and 19, 20, respectively. The guides 13 and 15 are grooved on the inside as shown for instance at 21 and 22, while the guides 14 and 16 are grooved on the outside as shown for instance at 23 and 24 in Fig. 6. The grooves are inclined with respect to the edges of the guides, as shown with respect to groove 21 in guide 13 in Fig. 7. Each of the slides 10 and 11 which, as will appear from Figs. 1 and 6, is formed with a tooth 25, and with a pin 26 projecting at both ends so as to engage one of the grooves in one of the guides when such guide is rocked into operative position. The guides are adjusted through the medium of a lever 27 and links 28, 29, and 30, 31, respectively, which are pivoted with slotted eyes to pins 32, 33 and 35, 36, respectively, on the free ends of the guides 15, 16 and 13, 14, respectively.

It will be understood that the curves in the guides being inclined relative to the edges of the guides will displace the slides 10 axially when the sprockets are rotating so that according to which guide has been brought into engagement with the slides, the slides will be successively moved into operative position between the discs 3, 4 and 7, 8, respectively, or withdrawn therefrom. Assuming, for instance, that the sprocket 3, 4 in Fig. 7 is rotating in the direction of the arrow and that the pins 26 of slides 10 are engaging the groove 23 in the inner guide 14, the slides are gradually withdrawn from between the discs until upon further rotation all the slides have disappeared from between the discs and the chain 9 is now free to engage the ordinary sprocket 1.

I wish it to be understood that I do not desire to be limited to the exact details of construction shown and described for obvious modifications will occur to a person skilled in the art. More particularly I am not limited to the mechanical means described for controlling the slides 10, 11, as this may be effected also by electromagnetic, pneumatic or hydraulic means, and the like, without departing from my invention.

I claim:—

1. A chain drive comprising two shafts, an ordinary sprocket on each shaft, a disc alongside of said sprocket, a circular row of slides axially displaceable in said disc, a stationary support, a pair of guides on said stationary support, a pin on each slide adapted to engage a groove defined in each of said guides, and means for placing each guide into cooperative position with the corresponding pin, and for moving the other guide out of such position, and vice versa.

2. A chain drive comprising a casing, two shafts rotatably carried in said casing, an invariable sprocket on each shaft, a disc on said sprocket, an annular rib on the outer side of said sprocket defining slots, a slide in each slot provided with a tooth to constitute a collapsible sprocket straddling said invariable sprocket, a pair of guides pivotally carried on said casing on either side of said rib, pins on each slide adapted to engage grooves in said guides, and means for placing said guides alternately into and out of operative connection with said pins.

In testimony whereof I affix my signature.

RUDOLF WICHTENDAHL.